Oct. 17, 1939.  H. H. BATES  2,176,601
BOLT HEATER
Filed July 27, 1937

WITNESSES:
J. K. Mosser
E. Lutz

INVENTOR
HARRY H. BATES.
BY
ATTORNEY

Patented Oct. 17, 1939

2,176,601

UNITED STATES PATENT OFFICE 2,176,601

BOLT HEATER

Harry H. Bates, Ridley Park, Pa., assignor to Westinghouse Electric & Manufacturing Company, East Pittsburgh, Pa., a corporation of Pennsylvania Application July 27, 1937, Serial No. 155,852

4 Claims. (Cl. 219—11)

My invention relates to an improved heating device of the type described in the patent to Hodgkinson, No. 1,839,850, granted January 5, 1932, and it has for its object to provide apparatus of this character wherein the resistance heating element has larger heating capacity without necessitating an increase in the bore diameter of the article to be heated or the diameter of the heating element.

The heating device disclosed in the patent aforesaid, because of its construction, is limited in current-carrying capacity, the reason being that the heating element must be formed as a loop extending into the bore and insulated therefrom to expose a pair of upper terminals connected to supply and return lines. In accordance with the present invention, the heating element has electrical contact with the metallic article to be heated so that the latter may be included in the circuit for supplying current to the heating element, with the result that, as current flows only in one direction at any instant in the heating element, the current-carrying capacity of the heating element may be greatly increased and the time required for heating may be substantially reduced as compared to the loop type of heating element disclosed in the patent. Not only may the current-carrying capacity be increased, but a structure is possible which is still more conducive to the attainment of this objective, as the heating element may be comprised by a single rod or a bundle of resistance wire of fairly large gauge, the bundle having electrical contact with the article to be heated at the inner end of the bore and being spaced by insulation from the interior of the bore sufficiently to restrict contact to the place intended so that the heating element is highly effective to radiate heat to the bolt or any suitable article throughout the length of the bore.

A further object of my invention is to provide a heating device having these advantageous features of construction and of operation.

The time for heating a bolt should be reduced to a minimum, not only to reduce the rise in temperature of parts, such as flanges, held together by the bolt, thereby making it easier to tighten or loosen the nut, but also to reduce the time required for removing nuts from several bolts or secure such nuts on the bolts to provide for desired tension in each bolt. Accordingly, a further object of my invention is to provide an electrical heating device wherein the bolt forms part of the electrical circuit for the conductive portion of the heating device so that current is required to flow only in a single direction through the resistance heating element, whereby the latter may be made relatively large and suitable to conduct large currents and consequently to heat bolts with such rapidity that they are expanded before parts confined thereby are expanded to any substantial extent.

A further object of my invention is to provide a heating device for a bolt to facilitate nut-tightening and loosening and which is constructed and arranged to apply heat to the bolt shank while protecting the threaded portion or portions from the application of heat.

These and other objects are effected by my invention as will be apparent from the following description and claims taken in connection with the accompanying drawing forming a part of this application, in which:

Figure 1:
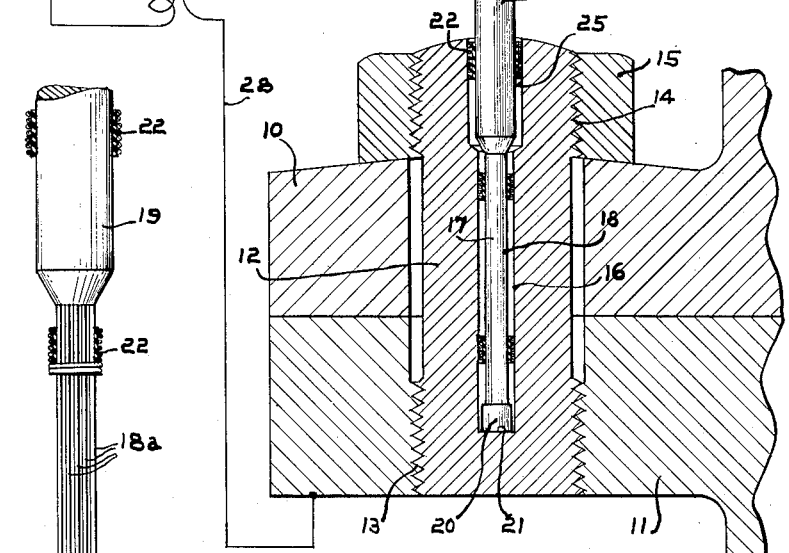
Fig. 1 is a sectional view showing a bolt with my improved heating device applied thereto.

Referring now to the drawing more in detail, there are shown upper and lower parts 10 and 11, for example, flanges of a steam turbine cylinder or casing, connected by bolts 12, one of which is illustrated. Each bolt preferably has threads 13 at its lower end for connection to the part 11 and threads 14 at its upper end for engagement by its nut 15. Assuming that the bolt is connected by the threads to the lower part 11, the nut 15 is tightened by means of a wrench in order to firmly clamp the parts 10 and 11 together.

To facilitate tightening or loosening of the nut, heat is applied to the bolt to expand the latter so that the nut may be tightened or loosened while the bolt is expanded with the result that, not only may a nut be easily removed, but, when tightening, due to contraction upon cooling, a very tight connection will be assured.

To the end that the bolt may be heated for the purpose just indicated, it is preferably provided with a bore 16 extending for a suitable length and providing for the reception of a heating device or implement, at 17, of the electrical type.

The heating device, or implement, at 17, includes an electrically conductive portion arranged in the bore 16 and having one end engaging the bottom of the bore to provide an electrical contact, the conductive portion preferably including a rod 18 made of high resistance alloy, such as nichrome, and having its ends joined autogenously, as by brazing, to terminals 19 and 20, the terminals 20 being shown as engaging the bottom 21 of the bore to provide for electrical contact between the conductive portion and the bolt.

The heating device or implement includes a sufficient number of insulating sleeves, at 22, encompassing and fixedly secured to the conductive portion to restrict electrical contact of the latter to the terminal 20 engaging the bottom 21 of the bore while exposing the resistance heating rod 18 to radiate heat directly to the bore wall.

The insulating sleeves are preferably comprised by an inner layer of refractory insulating material 23, for example, a wrapping of mica, held in place by a metallic retainer 24, which also serves to guide the device in the bore and thereby protect the insulation. Preferably, the metallic armor or retainer 24 is comprised by a wrapping of wire or alloy having high resistance to oxidation, for example, nichrome.

The conductive portion of the heating device, at 17, is preferably so constructed and arranged as to prevent, so far as practicable, the application of heat to threaded portion or portions of a bolt. To this end, the upper and lower terminal portions 19 and 20 are not only made of metal, such as copper, having relatively low electrical resistance, but each terminal has as large a cross section as possible consistent with freedom of movement incident to insertion and removal from the bore to minimize the resistance and heating effect of the terminal on the threaded portion, whereby the heat developed in the resistance heating element or rod 18 is largely applied to the shank of the bolt to expand the latter to facilitate nut-tightening or loosening with minimized application of heat to the threaded portions. To further aid in reducing the application of heat to a threaded portion of the bolt, for example, to the upper threaded portion 14, the bore 16 extending through such upper portion may have a counterbored portion 25 providing for the reception of an upper terminal 19 which is of larger cross section than the lower terminal 20, the resistance and heating effect being reduced not only by the larger section but also by the highly conductive nature of the material of which the terminal is made.

As the lower terminal is made of material having high conductivity for heat and electricity, burning of the contact is prevented and the current flow is not materially restricted, even though in practice the area of the terminal in contact with the bolt is usually less than the cross-section of the terminal. Since the terminal has low electrical resistance, little heat is developed on that account, and this, coupled with the high capacity for heat conduction, assures such ease of heat flow from the terminal to the bolt that the temperature at the contact is kept so low as to avoid burning of the contact and to preserve high electrical conductivity.

The circuit providing for flow of current through the conductive portion of the heating device, at 17, not only includes such conductive portion but also the bolt so that the necessity for return flow in the heating element is avoided. Accordingly, the circuit for supplying current to the resistance rod 18 includes the latter and the bolt, the circuit having leads 27 and 28 connected, respectively, to the terminal 19 and to the lower flange 11, the latter having electrical contact with the bolt through the threads 13.

While the circuit, including the leads 27 and 28, may be supplied with current by any suitable means, I prefer to use a transformer, shown generally at 30, whose secondary 31 is included in the bolt heating circuit, the primary 32 having its terminals connected to the leads L1 and L2. By providing for adjustment of the transformer in any well known manner, the current supplied by the secondary through the heating element 18 may be varied, it being understood that, the higher the current, the greater the rapidity of heating and the less time required to secure expansion of a bolt for nut-tightening purposes.

As the metallic article or bolt to be heated constitutes a part of the electrical circuit for supplying current to the resistance heating element, it will be apparent that the latter may be made of relatively large cross-section, and the same is true with respect to the terminals joined to the ends of the resistance heating element. Consequently, large currents may be used for heating and the temperature of the bolt may be caused to rise so rapidly that associated parts are heated only a relatively small amount before the bolt is expanded sufficiently for tightening or loosening purposes.

Figure 5:
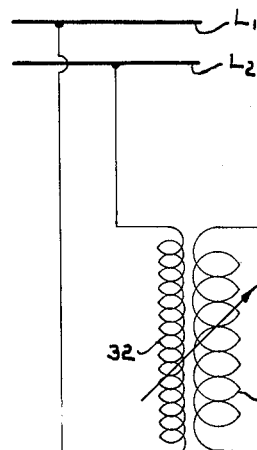
Figure 2:
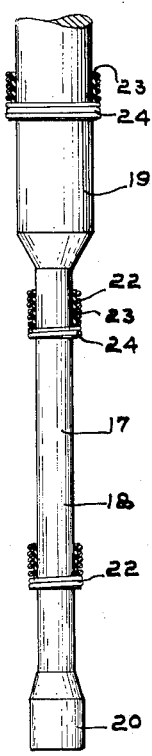
Fig. 2 is a fragmentary side elevational view of the heating device shown in Fig. 1.

In Fig. 5, there is shown a heating device or implement which is similar in all respects to that already described except for modification of the resistance heating element. Instead of using a single rod 18 made of high resistance alloy, such as nichrome, in Fig. 5, the resistance 18a is comprised by a bundle of rods or wires connected at their ends to upper and lower terminals 19 and 20.

In many situations, it is desirable that connecting bolts shall not only exert high tensile stress, but the stress should be as uniform as possible, in order to satisfactorily connect parts together, this being particularly true with steam turbines and the like, where both the casing and the bolts are subjected to expansion effects in normal operation and the initial bolt stress must be sufficient to hold the parts together with the desired tightness even when subject to high pressures and temperatures. In tightening the nuts to secure the desired initial tension, this must be done without galling the threads and without exceeding the elastic limits of the material.

Figure 3:
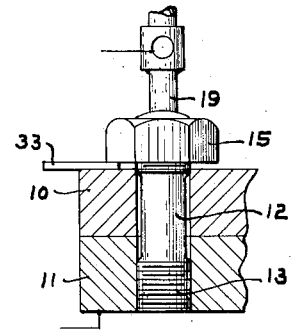
Figs. 3 and 4 are diagrams showing how bolts may be tightened to secure predetermined initial stress; and, Fig. 5 is a view, similar to Fig. 2, but showing a modified form of heating element.

To assure a predetermined stress in each bolt, the operation may be measured to secure this result. Assuming that the bolt is cold and that the nut is tightened by hand, then the bolt is heated until a thickness gauge 33 of predetermined thickness may be inserted between the nut and the flange, the clearance depending upon the length of the bolt. For example, 0.002" clearance for each inch of bolt length is found to be satisfactory in many cases. The operation of inserting a thickness gauge between the flange and the nut to determine how long to heat the bolt is shown diagrammatically in Fig. 3.

Figure 4:
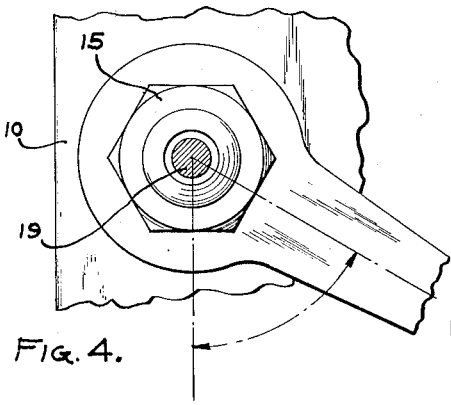

Another method of nut tightening and heating to assure the desired initial bolt stress is diagrammatically shown in Fig. 4. Here, as in Fig. 3, with the bolt cold, the nut is tightened by hand; and, knowing the bolt length and thread pitch, it may be readily determined how much angular movement of the nut is necessary to get the desired initial tension. Accordingly, heat is applied until sufficient expansion occurs to permit the nut to be turned angularly to the predetermined extent.

While the invention has been described particularly with reference to tightening or loosening bolt nuts, it will be apparent that it may be used in any situation where it is desired to apply heat internally of an electrically conductive article.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a portable elongated electrical heating implement for insertion into bores of electrically conductive metallic objects and effective to heat the latter upon completion of an electrical circuit therethrough by contact thereof with the object, an elongated metallic resistance heating element having its exterior surface exposed, a metallic terminal joined to one end of the resistance element, a metallic contact joined to the other end of the resistance element and adapted to engage the bottom of an object bore, said terminal and contact being comprised by metal having relatively high electrical conductivity, and insulating means encompassing metallic portion or portions of the implement for spacing the latter from the bore wall of an object in order that engagement of said metallic portions with the object may be restricted to said contact.

2. The combination as claimed in claim 1 wherein the insulating means includes one or more rings encompassing the implement to space the latter from the bore wall and to provide for the exposure of the maximum amount of surface thereof for radiation of heat directly to the bore wall.

3. The combination as claimed in claim 1 wherein the metallic resistance element is comprised by an alloy of nickel and chromium and the contact and terminal are made of copper.

4. The combination as claimed in claim 1 wherein the metallic resistance element is comprised by a bundle of nichrome wire with the strands disposed in side-by-side relation.

HARRY H. BATES.